(12) United States Patent
Pommeret

(10) Patent No.: US 6,227,594 B1
(45) Date of Patent: May 8, 2001

(54) MOTOR VEHICLE TAILGATE MOUNTED TO PIVOT ABOUT A HORIZONTAL AXIS IN THE VICINITY OF ITS BOTTOM EDGE

(75) Inventor: Maelig Pommeret, Oyonnax (FR)

(73) Assignee: Compagnie Plastic Omnium, Lyons (FR)

(*) Notice: Subject to any disclaimer, the term of this patent is extended or adjusted under 35 U.S.C. 154(b) by 0 days.

(21) Appl. No.: 09/501,851

(22) Filed: Feb. 10, 2000

(30) Foreign Application Priority Data

Feb. 12, 1999 (FR) .................................................. 99 01715

(51) Int. Cl.[7] ...................................................... B62D 25/00
(52) U.S. Cl. ........................ 296/57.1; 296/37.1; 296/901
(58) Field of Search .......................... 296/57.1, 60, 37.1, 296/37.3, 106, 146.8, 901; 40/211

(56) References Cited

U.S. PATENT DOCUMENTS

| 1,232,970 | * | 7/1917  | Pucher . |
| 1,289,225 | * | 12/1918 | Montan . |
| 1,838,344 | * | 12/1931 | Wilson . |
| 2,631,880 |   | 3/1953  | Vigmostad . |
| 3,398,985 |   | 8/1968  | Rhoades . |
| 3,612,601 |   | 10/1971 | Hinka . |
| 4,438,971 | * | 3/1984  | Saydel et al. .......................... 296/191 |
| 5,035,449 | * | 7/1991  | Shiratori et al. ........................ 292/48 |
| 6,003,931 | * | 12/1999 | Dancasius et al. ............... 296/146.8 |
| 6,073,991 | * | 6/2000  | Naert .................................... 296/197 |

FOREIGN PATENT DOCUMENTS

| 0835775   |   | 4/1998  | (EP) . |
| 790587    | * | 9/1935  | (FR) .................................... 296/37.1 |
| 2748241   |   | 11/1997 | (FR) . |
| 2748969   |   | 11/1997 | (FR) . |
| 1-273721  | * | 11/1989 | (JP) .................................... 296/106 |
| WO 91/07296 | * | 5/1991  | (WO) ............................... 296/37.13 |

* cited by examiner

Primary Examiner—D. Glenn Dayoan
Assistant Examiner—Mickki D. Murray
(74) Attorney, Agent, or Firm—Schweitzer Cornman Gross & Bondell LLP

(57) ABSTRACT

A motor vehicle tailgate of the type for installing on a motor vehicle so as to pivot about a horizontal axis situated close to the bottom edge of the tailgate between a closed position in which it closes access to the inside of the vehicle, at least in part, and an open position in which it is substantially horizontal and releases access to the inside of the vehicle. It comprises an appearance-defining outer panel and a structural inner panel, the inner panel being made of a plastics material.

6 Claims, 6 Drawing Sheets

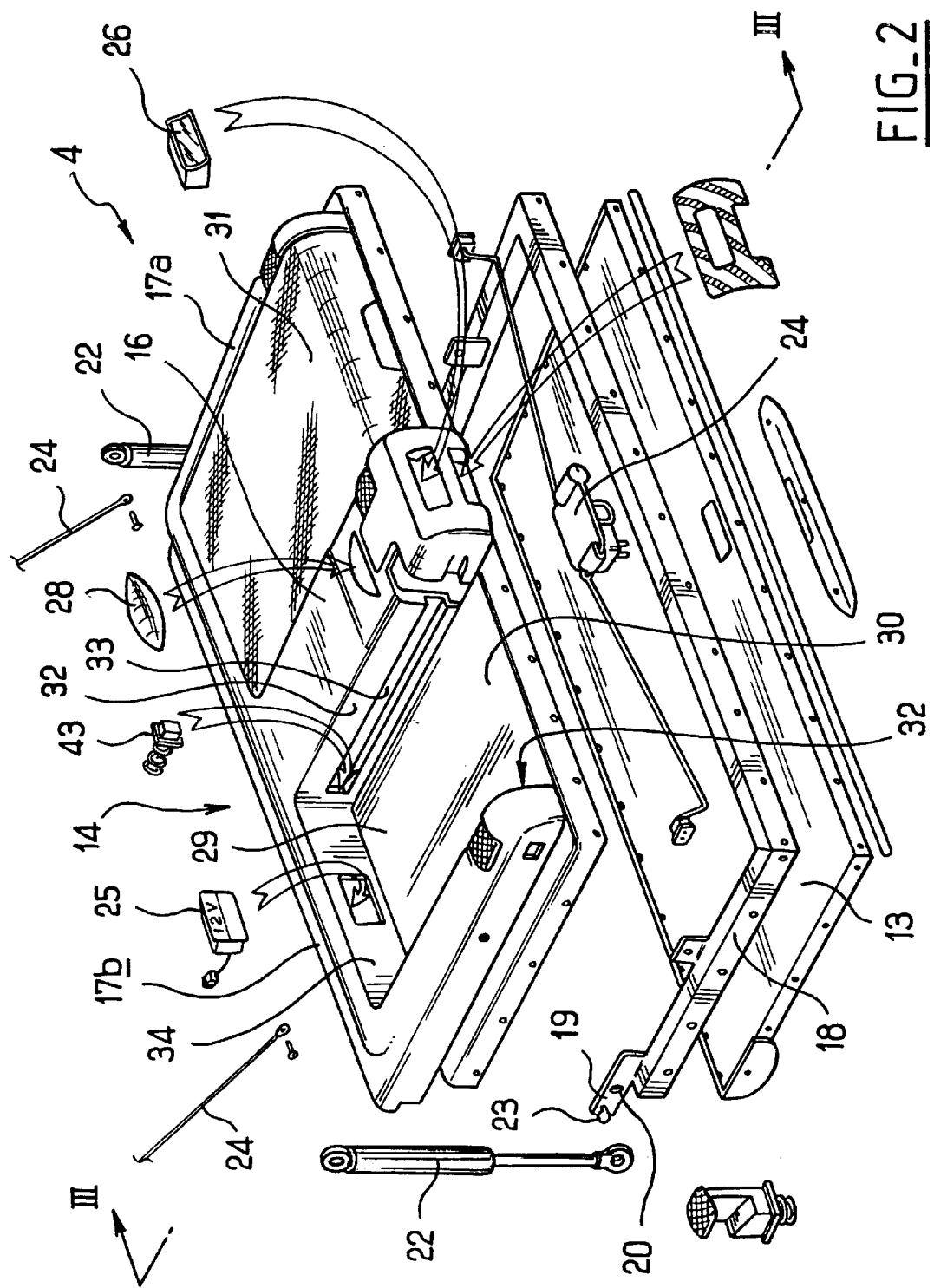
FIG_2

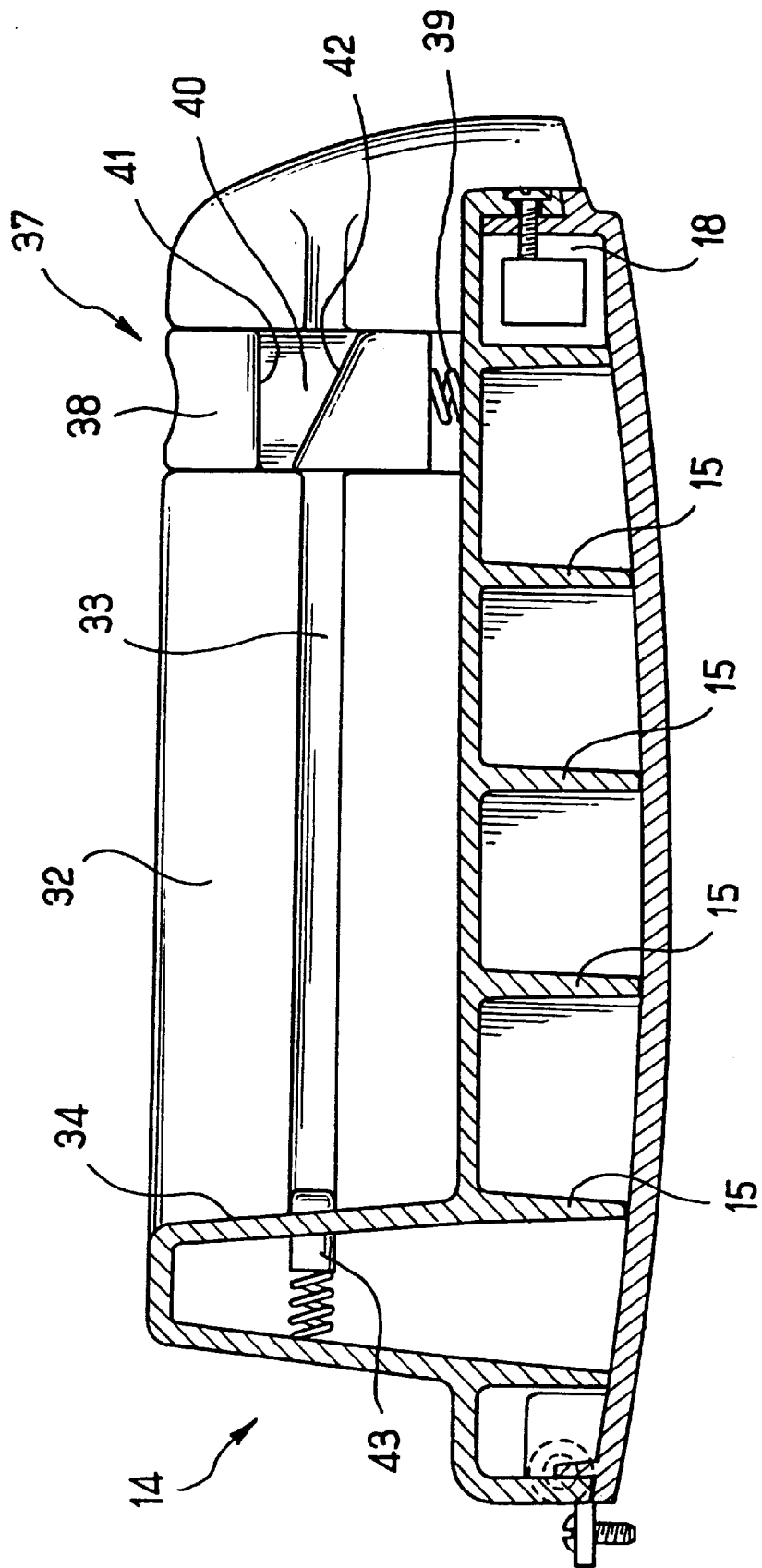
FIG_3

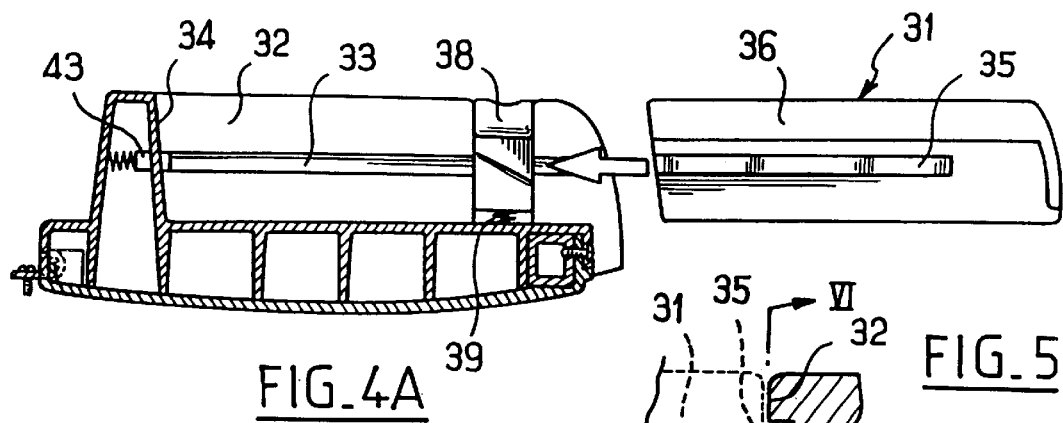
FIG_4A    FIG_5
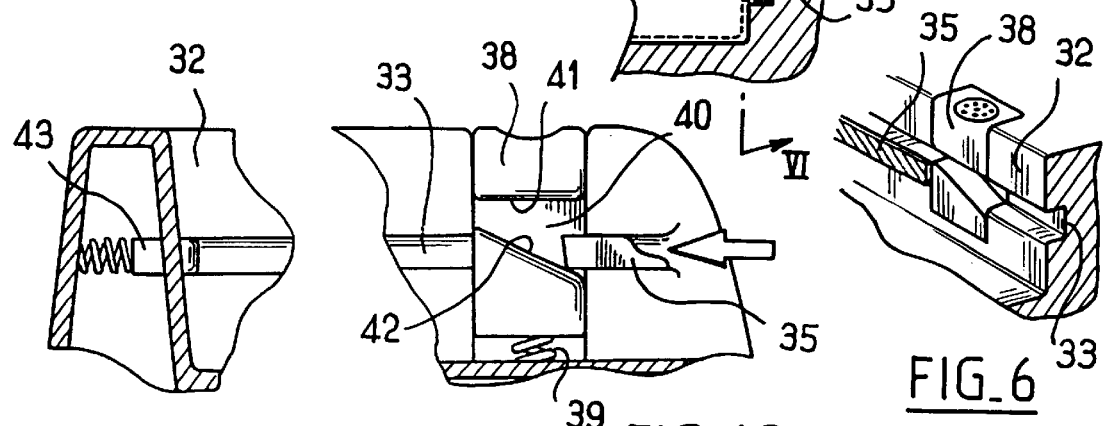
FIG_4B    FIG_6
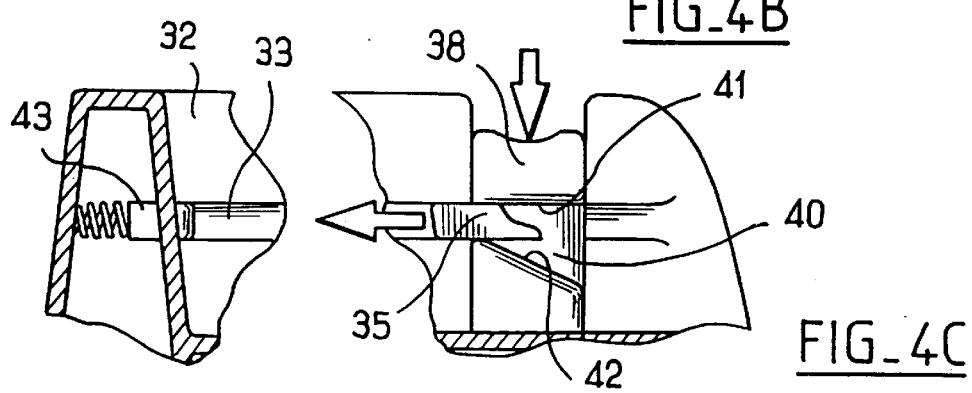
FIG_4C
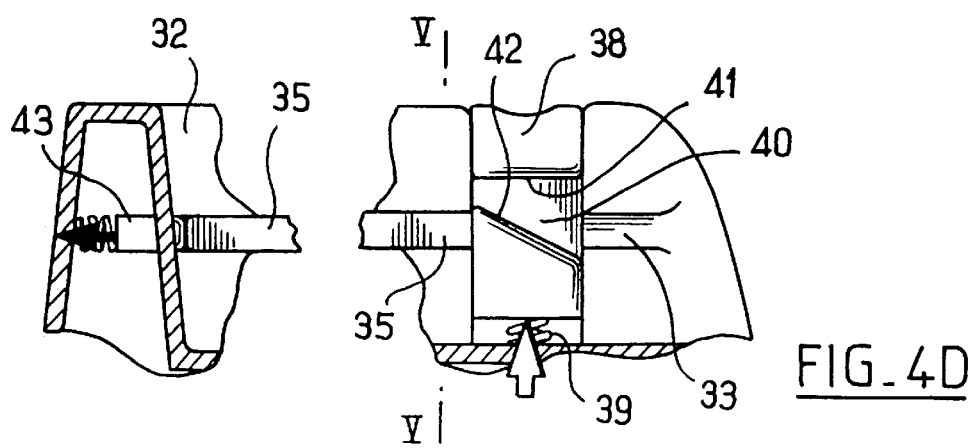
FIG_4D

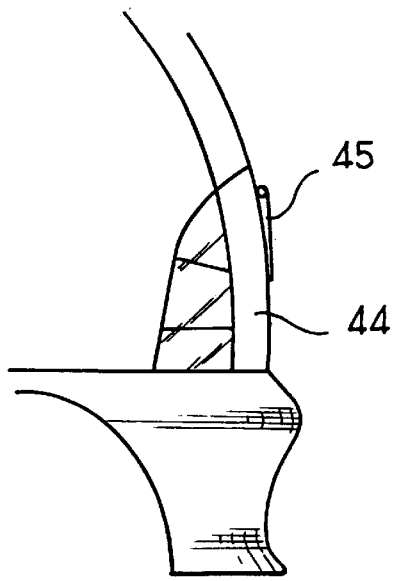
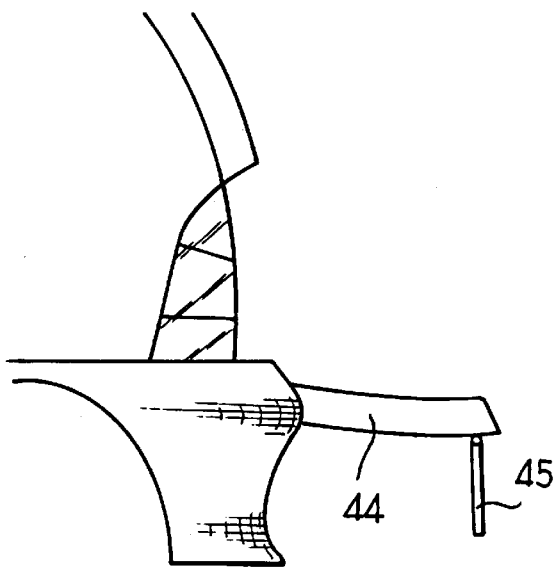
FIG_7
FIG_8
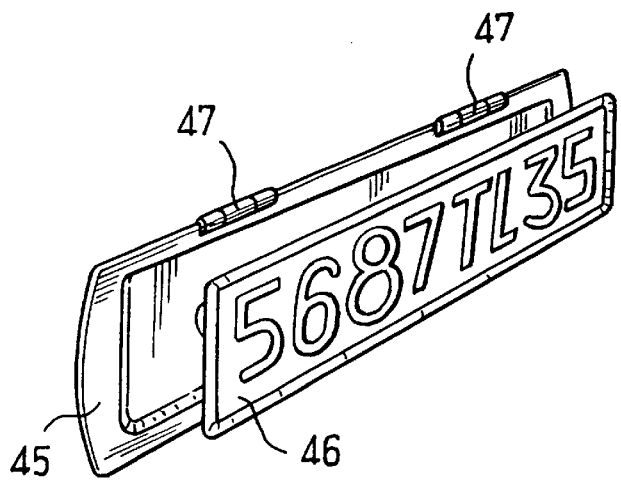
FIG_9

MOTOR VEHICLE TAILGATE MOUNTED TO PIVOT ABOUT A HORIZONTAL AXIS IN THE VICINITY OF ITS BOTTOM EDGE

The present invention relates to a motor vehicle tailgate mounted to pivot about a horizontal axis in the vicinity of its bottom edge.

BACKGROUND OF THE INVENTION

Such a tailgate is generally fitted to a cross-country type vehicle whose rear opening is closed in its top portion by a tailgate which has an upper portion extending from the roof down to a certain height, and a lower portion constituting the subject matter of the present invention, and which extends the upper portion down to the floor of the vehicle.

For an example of such a tailgate, reference can be made to document U.S. Pat. No. 3,398,985.

It will be understood that such a tailgate is very fragile when in the open position since it is cantilevered out, thus making it necessary for it to be made out of metal, using a structure that is determined by the requirement for strength to the exclusion of any other functional or decorative characteristic.

OBJECTS AND SUMMARY OF THE INVENTION

The present invention seeks to provide a motor vehicle tailgate which is. not only strong as required by its function, but which also presents a structure enabling it to perform functions other than mere closure.

The present invention provides a motor vehicle tailgate of the type for installing on a motor vehicle so as to pivot about a horizontal axis situated close to the bottom edge of the tailgate between a closed position in which it closes access to the inside of the vehicle, at least in part, and an open position in which it is substantially horizontal and releases access to the inside of the vehicle, the tailgate comprising an appearance-defining outer panel and a structural inner panel, said inner panel being made of a plastics material.

Advantageously, the inner panel presents shapes in relief, in particular including ribs, and presents a structure that is rigid.

The tailgate of the invention presents the original feature of being strong because of its structure incorporating a structural inner panel, while nevertheless being simple to make and of low cost because its two panels can easily be made by molding.

Preferably, the inner panel is made of polypropylene mixed with glass fibers or of a thermosetting plastics material, and the outer panel is made of a thermoplastic material, with the outer panel optionally being subsequently subjected to painting treatment.

In a particular embodiment of the invention, the tailgate includes metal reinforcement between the outer panel and the inner panel, which reinforcement takes up a fraction of the forces that are exerted on the tailgate.

The tailgate of the invention provides the advantage whereby the inner panel of plastics material can perform functions other than the mere closure function, thus making it possible to use the tailgate for other purposes, whether it is in the open position or in the closed position.

In a preferred embodiment, the inner panel has housings suitable for receiving modules that are received at least in part in the thickness of the tailgate and that provide special functions.

As examples of modules, mention can be made in particular of a seat so that the tailgate can be sat on when it is in the open position, storage that is available both when the tailgate is in its open position and when it is in its closed position, which storage can, in particular, contain tools or first-aid equipment, an insulated picnic box for keeping food cool, a cooker for cooking food, or a table that can be used when the tailgate is in the open position.

Preferably, the modules are two in number and are disposed on either side of a central upright formed in the inner panel to stiffen it in the region of the lock of the tailgate.

In a preferred variant of this embodiment, the inner panel includes retention means for retaining the modules in their housings, the retention means being releasable.

By way of example, the retention means may consist in a slideway and a latch.

In a particular embodiment of the invention, the outer panel of the tailgate supports a flap hinged about a horizontal axis enabling said flap to pivot relative to the tailgate so that the flap remains in a vertical position when the tailgate pivots from its closed, vertical position to its open, horizontal position.

The flap is designed to carry the number plate of the vehicle and allows the vehicle to be used while leaving the tailgate open, e.g. for transporting bulky objects, while still keeping its number plate visible, as required by legislation.

BRIEF DESCRIPTION OF THE DRAWINGS

In order to make the invention better understood, there follows a description of embodiments given as non-limiting examples and made with reference to the accompanying drawings, in which:

FIG. 2 is an exploded perspective view of the tailgate of FIG. 1;

FIG. 3 is a section view on III—III of FIG. 2;

FIGS. 4A to 4D are section views on III—III showing how the modules snap-fasten in the tailgate lower portion;

FIG. 5 is a section view on V—V of FIG. 4D;

FIG. 6 is a perspective and section view on VI—VI of FIG. 5;

FIG. 7 is an elevation view of the rear corner of another vehicle provided with a tailgate of the vehicle;

FIG. 8 is a view analogous to FIG. 5 showing the tailgate in the open position;

FIG. 9 shows a flap supporting a number plate belonging to the tailgate of FIGS. 5 and 6.

MORE DETAILED DESCRIPTION

Figure 1:
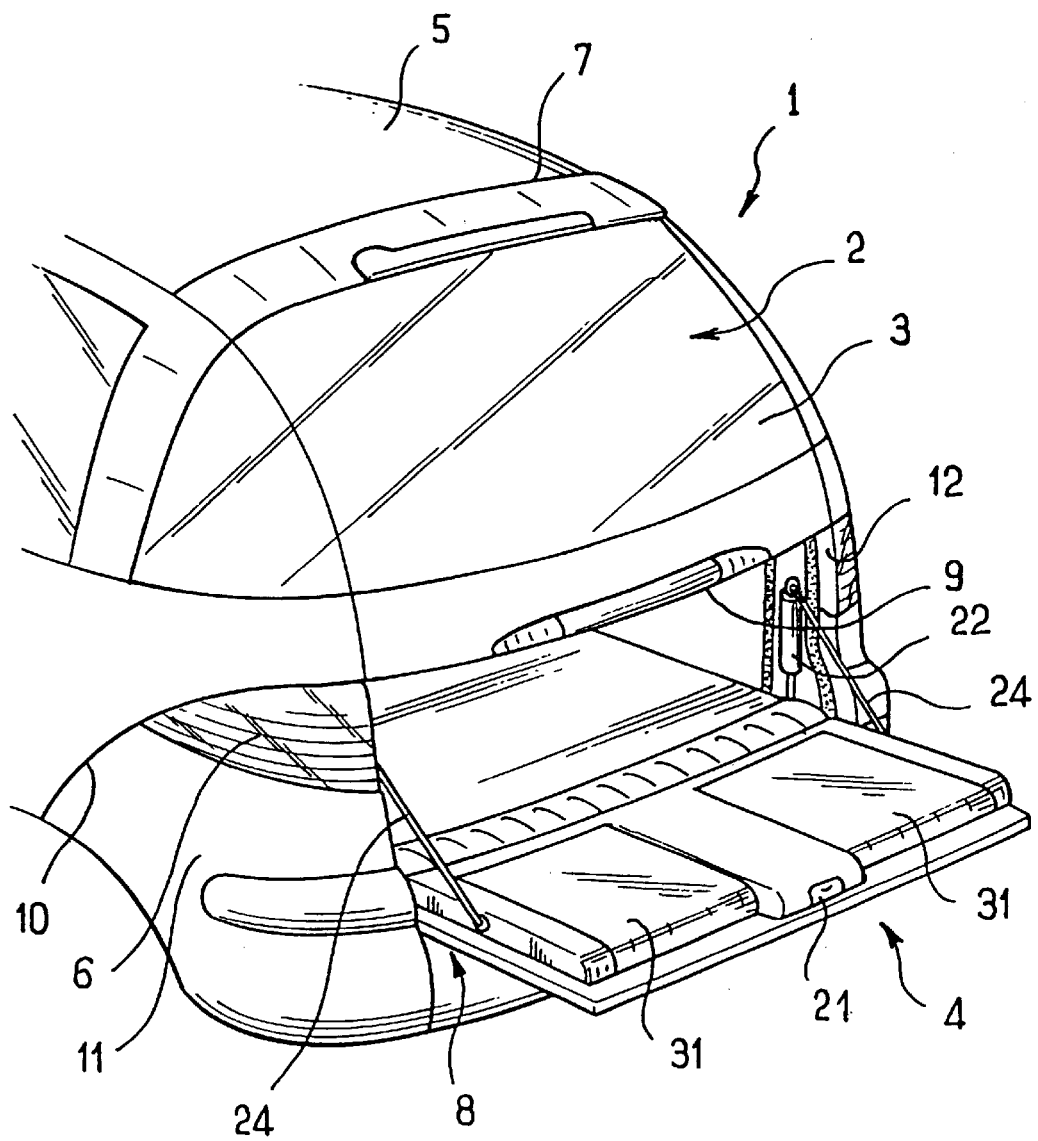
FIG. 1 is a three-quarter rear perspective view of a motor vehicle.

FIG. 1 shows the back of a motor vehicle 1 of the one-box type, including a rear opening 2 giving access to the cabin. The top portion of the opening is closed by a tailgate upper portion 3 and its bottom portion is closed by a tailgate lower portion 4.

The tailgate upper portion 3 extends from the roof 5 of the vehicle to the level of its tail lights 6, and it is hinged along its top edge 7 via hinges (not shown) which enable it to pivot about a horizontal axis.

The tailgate lower portion 4 is hinged about hinges (not visible) situated in the vicinity of its bottom edge 8, which hinges enable it to pivot about a horizontal axis.

The upper and lower portions 3 and 4 of the tailgate meet in the closed position along a join line 9 extending a line of styling 10 which starts in the fenders 11 of the vehicle and runs along the tops of the tail lights 6. When the tailgate portions are in the open position, access to the cabin is completely unimpeded, and the tailgate portions extend substantially horizontally.

In FIG. 1, only the lower portion 4 is open, the upper portion 3 being closed and being held in this position by a central lock 24 provided on the lower portion.

FIG. 2 shows the structure of the tailgate lower portion 4.

It comprises firstly an outer panel or skin 13 that is substantially plane and made of polypropylene.

It also has an inner panel 14 of polypropylene mixed with glass fibers, and of a shape in relief that enables it to perform a structural function.

The inner panel 14 is generally flat but has ribs 15 (visible in FIG. 3), a central upright 16 projecting from the remainder of the panel, and parts of a frame constituted by lateral edges 17a and a bottom edge 17b.

The upright 16 and the partial frame 17a, 17b cooperate with the ribs 15 to provide the rigid structure of the panel.

Between the inner panel 14 and the outer panel 13, the tailgate has an aluminum frame 18 which reinforces the structural portions of the inner panel as constituted by the central upright and its partial frame, and which provides anchor points for taking up the forces to which the tailgate is subjected.

These anchor points are the hinges of the tailgate, its lock, and the anchor points for the equalizers and the retaining cables, as described below.

The hinges of the tailgate are secured to the metal frame in the form of an extension 22 terminated by a hinge pin 23 which penetrates into a corresponding orifice provided in the frame 12 around the opening in the vehicle.

The lock 24 of the tailgate is likewise secured to the metal frame 18 onto which it is mounted directly by means of screws (not shown).

The equalizers 22 are cylinders connected to the frame 12 around the opening with respective rods connected to pins 23 situated beyond the bearing 20, away from the tailgate and serving to compensate for the weight of the tailgate so as to make it easier to handle.

Retaining cables 24 are also fixed to either side of the tailgate, between the frame of the opening 12 and the metal frame 18 of the tailgate, thus providing the tailgate with good strength against loading.

In addition to its function as a structural part of the tailgate, the inner panel also provides various functions which are described below.

In the bottom edge 17b of each housing, an electricity outlet 25 is provided to supply electricity in the event of an electrical appliance being used when said housing is empty, regardless of whether the tailgate is open or closed.

A warning lamp 26 is engaged in the end of the upright 16 and serves to mark the tailgate when it is open and the vehicle is traveling, so as to warn following vehicles of the danger constituted by the tailgate projecting from the vehicle.

The warning lamp 26 is surrounded by reflective marking 27 to make it more effective.

A handle 28 is formed in the upright to make it easier to close the tailgate when it is in the open position, in particular from the inside of the vehicle.

On either side of its central upright 16, the inner panel 14 defines two housings 29 which are defined by the edges 17a and 17b and which have back walls 30 constituted by the flat portion of the panel.

Each of these housings 29 is designed to receive a respective module 31.

The various modules that can be used in the tailgate include, in particular, a seat, a picnic table, an insulated picnic box, a cooker, a "pillow" headrest, a support for lighting, an unloading ramp, a storage compartment, a case, a tool box, a support for electrical apparatuses such as a computer or measurement apparatus that can be powered from the electricity outlet, a writing desk, a support for securing objects that are long and fragile, or a single, two-part box extending over the entire width of the tail gate.

To simplify the drawing, there is shown a module 31 in the form of a rectangular parallelepiped which fits in the thickness of either housing.

The way in which the module 31 is fixed in the housing 29, as described below with reference to FIGS. 4A to 4D, 5, and 6, could naturally be adapted to any other type of module.

Each housing side wall 32 has a groove 33 integrally molded therein and extending from the open end of the housing which is the top end when the tailgate is closed, all the way to the bottom wall 34 of each housing.

Each groove 33 receives a skid 35 projecting from the side wall 36 of a module 31, which skid slides along the groove 33 and guides the module while it is being inserted in the housing, by moving in translation from right to left as shown in FIG. 3.

In the vicinity of its open end, each groove 33 intersects a chimney 37 which holds a locking latch 38 constituted by a square section tubular piece extending over nearly the full height of the chimney, and urged towards the outside of the chimney, i.e. upwards relative to FIG. 3, by a helical spring 39 acting between the end of the chimney and the base of the latch.

Halfway along the latch 38, there is formed a setback 40 defined on top by an edge 41 parallel to the groove and at the bottom by an edge 42 which slopes so that when the latch 38 is at rest it begins from beneath the groove adjacent to the open end of the groove and terminates above the groove remote from its open end.

In its rest position, the latch 38 is flush with the top face of the upright 16 where it includes a hollow shape for making it easier for the user to apply finger force thereto.

When the latch 38 is pushed in under the effect of such force, the bottom sloping edge 42 of the opening 40 moves so as to lie completely beneath the groove 33, thereby allowing the skid of a module to pass through.

However, when the latch 38 is at rest, i.e. when it is pushed upwards by the spring 39, the skid 35 can no longer pass through.

It will be understood that in the module-insertion direction, as shown in FIG. 4B, the sloping bottom edge 42 of the opening serves as a cam so that thrust exerted on the module is transmitted to the latch which is pushed in so as to release a passage for the skid, after which it returns to its rest position.

In contrast, once the module is in place, and so long as no pressure is exerted on the latch, the latch will stay in place and oppose passage of the skid, thereby retaining the module in the housing, as can be seen in FIGS. 4D and 6.

By pressing down the latch 38, a passage is released for the skid 35, thereby allowing the module 31 to move out from the housing under drive from a spring-loaded pusher 43 housed in the closed end of the groove 33.

FIGS. 7 to 9 show an embodiment in which the tailgate 44 of a vehicle has substantially the same structure as in the preceding embodiment, but is further provided with a flap 45 that carries a number plate 46.

The flap 45 is mounted on the outer panel of the tailgate by horizontal axis hinges 47 that allow the flap to pivot under the effect of its own weight so that said flap always remains in a vertical position regardless of the position of the tailgate.

Nevertheless, the flap 45 is locked in a "retracted" position when the tailgate lower portion is closed by means of a locking device (not shown) which is coupled to the control for opening the tailgate.

Thus, so long as the tailgate lower portion is closed, the flap remains pressed against the outer panel in spite of any vehicle vibration.

However, when the tailgate is opened by actuating its opening control, the flap 45 is released and can take up the position shown in FIG. 8, in which position it can also be held stationary by any suitable means.

In a variant (not shown), the hinges 47 include a bistable mechanism for fixing them in two angular positions that are spaced apart by 90°, such that the flap is held angularly relative to the tailgate so as to prevent it from swinging while the vehicle is moving. Under such circumstances, the flap can be positioned by hand as a function of the open or closed position of the tailgate.

The number plate lighting system can also be supported by the flap 45 so as to enable the vehicle to be used at night with the tailgate down.

Figure 10:
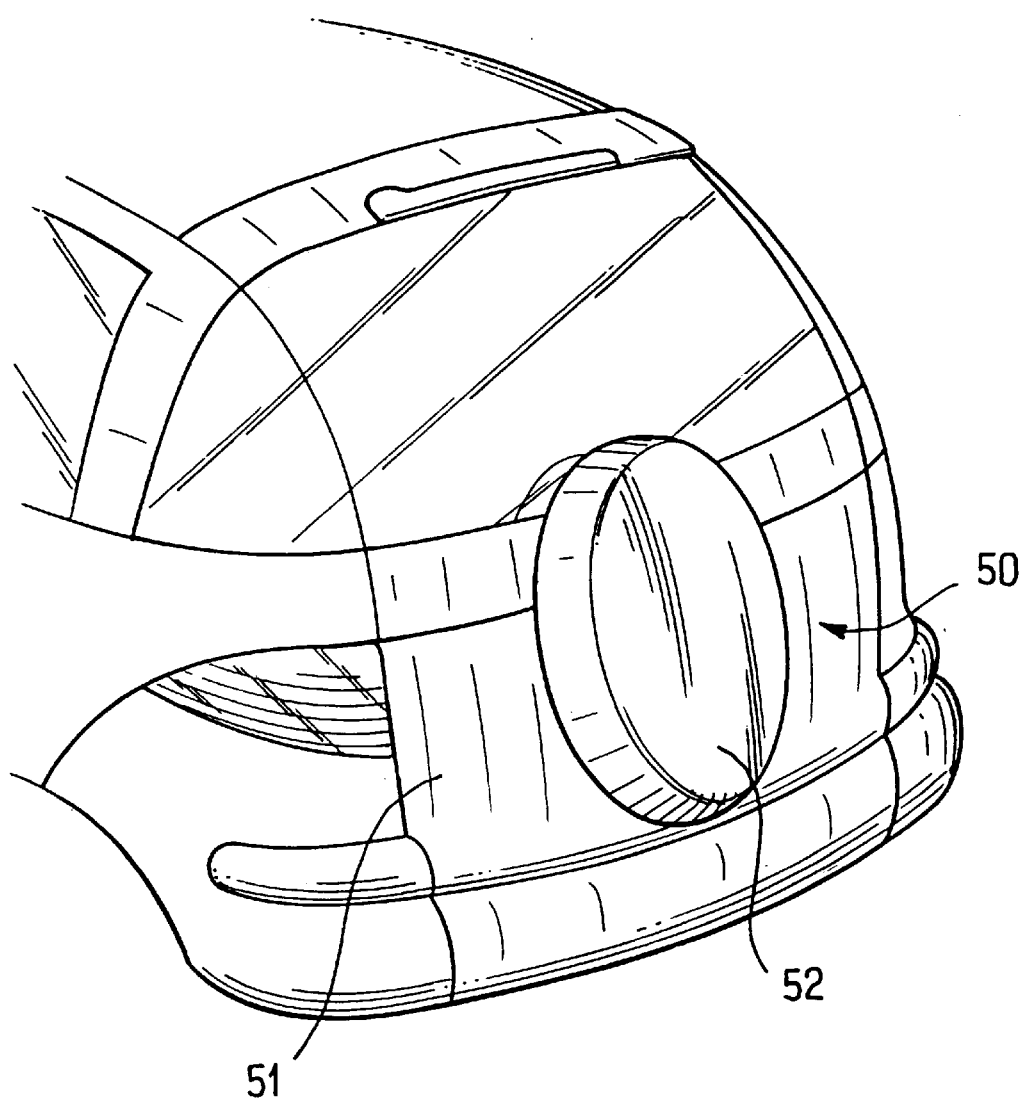
FIG. 10 is a three-quarters rear perspective view of another motor vehicle.

In the embodiment of FIG. 10, the tailgate lower portion 50 has an outer panel 51 that is removable and in which there is provided a shape in relief 52 corresponding to the space occupied by a spare wheel.

The inner panel (not shown) has the same shape provided on the inside of the vehicle.

In this embodiment, the main supplementary function of the tailgate, additional to its function of closing the tail of the vehicle, is the function of receiving the spare wheel while protecting it from external attack and contributing to an improvement in the appearance of the vehicle.

The outer panel can be unlocked to give access to the spare wheel.

The unlocking control is to be found on the inside of the vehicle, e.g. on the inner panel of the tailgate.

Naturally the embodiments described above are not limiting in any way and can receive any desirable modification without thereby going beyond the ambit of the invention.

What is claimed is:

1. A tailgate adapted to be mounted in the rear of a motor vehicle for pivoting movement about a horizontal axis proximate the bottom edge of the tailgate; said tailgate being pivotable about said axis between a generally upright closed position in which the tailgate prohibits access to the vehicle interior, and a generally horizontal open position in which the tailgate provides access to the vehicle interior; the tailgate comprising an appearance-defining outer panel of a thermoplastic material; and a structural inner panel of polypropylene mixed with glass fibers or of a thermosetting plastics material;

the inner panel is shaped to include ribs and forms a rigidified structure;

a metal reinforcement is disposed between the outer panel and the inner panel, said metal reinforcement absorbing a portion of the forces exerted on the tailgate; and the inner panel having module housings for receiving function-performing modules, said modules being received at least in part in the thickness of the tailgate.

2. A tailgate according to claim 1, including two modules disposed on either side of a central upright formed in the inner panel to stiffen the panel in the central region of the tailgate in which a lock may be disposed.

3. A tailgate according to claim 1, wherein the inner panel includes selectively releasable retention means for retaining the modules in their housings.

4. A tailgate according to claim 3, wherein each retention means comprises a slideway and a latch.

5. A tailgate according to claim 1, wherein the outer panel of the tailgate supports a flap hinged about a horizontal axis enabling said flap to pivot relative to the tailgate so that the flap remains in a generally vertical position when the tailgate pivots from its closed position to its open position.

6. A tailgate according to claim 1, including recessed portions in at least the outer panel for the purpose of receiving a spare wheel.

* * * * *